(12) United States Patent
Ballato et al.

(10) Patent No.: US 6,947,208 B2
(45) Date of Patent: Sep. 20, 2005

(54) OPTICAL FIBER AMPLIFIER WITH FULLY INTEGRATED PUMP SOURCE

(76) Inventors: John Ballato, 113 Grace St., Clemson, SC (US) 29631; David L. Carroll, 219 Luna Ave., Central, SC (US) 29630

( * ) Notice: Subject to any disclaimer, the term of this patent is extended or adjusted under 35 U.S.C. 154(b) by 0 days.

(21) Appl. No.: 10/351,118

(22) Filed: Jan. 24, 2003

(65) Prior Publication Data
US 2003/0184852 A1 Oct. 2, 2003

Related U.S. Application Data
(60) Provisional application No. 60/351,473, filed on Jan. 25, 2002.

(51) Int. Cl.[7] ............................................. H01S 3/00
(52) U.S. Cl. ................................................ 359/341.32
(58) Field of Search ........................... 372/38.06, 70, 372/85, 88; 359/341.3, 341.32, 134, 160

(56) References Cited

U.S. PATENT DOCUMENTS

| | | | |
|---|---|---|---|
| 3,484,710 A | * 12/1969 | Koester | 359/341.3 |
| 3,571,737 A | * 3/1971 | Miller | 359/341.3 |
| 3,611,179 A | * 10/1971 | Fyler | 372/6 |
| 4,001,704 A | * 1/1977 | Danielmeyer et al. | 359/341.3 |
| 4,769,823 A | * 9/1988 | Dube | 372/70 |
| 4,864,516 A | 9/1989 | Gaither et al. | 350/96.14 |
| 4,955,025 A | 9/1990 | Mears et al. | 372/6 |
| 4,955,685 A | * 9/1990 | Garman | 359/341.32 |
| 5,005,175 A | 4/1991 | Desurvire et al. | 372/6 |
| 5,131,000 A | * 7/1992 | Sugimoto et al. | 372/41 |
| 5,282,080 A | 1/1994 | Scifres et al. | 359/344 |
| 5,313,485 A | * 5/1994 | Hamil et al. | 372/69 |
| 5,448,586 A | * 9/1995 | Shmulovich et al. | 372/70 |
| 5,745,518 A | * 4/1998 | Cuadros | 372/70 |
| 5,859,938 A | 1/1999 | Nabeyama et al. | 385/24 |
| 5,892,859 A | 4/1999 | Grote | 385/2 |
| 6,104,526 A | 8/2000 | Kakui | 359/337 |
| 6,141,468 A | 10/2000 | Kidorf et al. | 385/24 |
| 6,363,088 B1 | * 3/2002 | Alphonse et al. | 372/6 |
| 6,680,962 B2 | * 1/2004 | Liu et al. | 372/94 |
| 6,683,892 B1 | * 1/2004 | Yamaura et al. | 372/6 |

FOREIGN PATENT DOCUMENTS

JP          2002141603        * 11/2000

OTHER PUBLICATIONS

Desurvire, E., Scientific American, Jan. 1992, PP 114–121.*
Desurvire, E., Physics Today, Jan. 1994, pp 20–27.*

* cited by examiner

*Primary Examiner*—Bernarr E. Gregory
*Assistant Examiner*—Deandra M. Hughes
(74) *Attorney, Agent, or Firm*—Leigh P. Gregory

(57) ABSTRACT

An amplifying optical element for use within an optical fiber communication system is disclosed which includes a doped optical fiber, an optical excitation source which is physically integrated with and immediately adjacent to and surrounding doped optical fiber, the excitation source being capable of emitting sufficient light to enable power gain of the signal being transmitted, and an external power source electrically connected to the optical excitation source for initiating and maintaining the light emission. Preferably, the excitation source is a multilayer electrically conductive structure which includes a first layer immediately adjacent to the doped optical fiber, wherein the first layer is a transparent, electrically conductive material, a second layer adjacent to the first layer, wherein the second layer is an electroluminescing material, and a third layer adjacent to the second layer, wherein the third layer is an electrically conductive material. Most preferably, a buffer layer is included between the first and second layer and between the second and third layer. Alternatively, the excitation source may be a microring laser, which may be optically excited.

8 Claims, 4 Drawing Sheets

OPTICAL FIBER AMPLIFIER WITH FULLY INTEGRATED PUMP SOURCE

This application claims the benefit of prior provisional application, U.S. Ser. No. 60/351,473, filed Jan. 25, 2002.

FIELD OF THE INVENTION

This invention relates to optical fiber communications systems and more particularly to an optical fiber communication system having optical pumping units physically integrated with the optical amplifiers.

BACKGROUND OF THE INVENTION

Optical waveguide technology provides a solution to the continuing telecommunications challenge of capacity to transmit with precision high volumes of data. Current fiber optic systems transmit greater than to $10^{12}$ bits/sec.

Basically, commercial waveguide systems use optical fibers to carry large amounts of multiplexed digital data over long distances from a transmit terminal to a receive terminal. The maximum distance that the data can be transmitted in the fiber without amplification or regeneration is limited by the loss associated with the optical fiber and other components in the system. To transmit optical signals over long distances, optical fiber communication systems may include a number of amplifiers located along the fiber route from the transmit terminal to the receive terminal. Each amplifier optically boosts the weak signal to compensate for the transmission losses, or attenuation, which occurred subsequent to the last amplification. Most typical are rare earth doped optical fiber amplifiers.

The prior art teaches that an optical fiber doped with an appropriate substance can, when properly excited, radiate energy via stimulated emission at the same wavelength as the transmitted signal. Thus, such optical fiber acts as an amplifier. Light energy to excite the dopant is generated by an optical pump external to, yet optically connected to the optical fiber amplifier. Most frequently the pump device is connected to the optical fiber amplifier by means of an optical coupler. Effective connection requires sophisticated technology to ensure proper alignment of the optical fiber amplifier and the optical coupler as well as efficient energy transfer.

SUMMARY OF THE INVENTION

According to the present invention, in applications relating to the optical transmission of information over long distances, the need for a fiber optic coupler to join the pump device and the optical fiber amplifier is eliminated by integrating the pump device directly onto the fiber amplifier. Luminescence is generated in response to electrical power applied through a thin emissive polymer film; this film is directly applied to the rare earth doped optical fiber. Such luminescence is transmitted into the doped optical fiber thereby exciting the rare earth atoms that radiate energy at the same wavelength as the transmitted signal. The radiation of the rare earth atoms, under appropriate conditions, can constitute amplification of the signal being transmitted. Although the optical waveguide is most commonly an optical fiber, other waveguide geometries are also within the scope of the present invention.

Thus, the present invention is directed to an amplifying optical element within a signal-carrying system, which includes a dielectric optical waveguide; an optical excitation source, the excitation source being physically integrated with and immediately adjacent to and surrounding the optical waveguide, the excitation source being capable of emitting sufficient light to enable power gain of said signal; and an external power source electrically connected to the optical excitation source for initiating and maintaining the light emission. Preferably, the optical excitation source is a multilayer electrically conductive structure, which includes a first layer immediately adjacent to the waveguide, wherein the first layer is a transparent, electrically conductive material; a second layer adjacent to the first layer, wherein the second layer is an electroluminescing material; and a third layer adjacent to the second layer, wherein the third layer is an electrically conductive material.

In another aspect the present invention is directed to an amplifying optical element within a signal-carrying system, which includes a dielectric optical waveguide transmitting a signal and capable of excitation, and an optical excitation source, which is physically integrated with and immediately adjacent to and surrounding the optical waveguide, the excitation source being capable of emitting sufficient light to enable power gain of the signal. In one embodiment the optical excitation source is a microring laser, which may be optically excited.

DETAILED DESCRIPTION OF THE PREFERRED EMBODIMENTS

The present invention is directed to an amplifying optical element for use in an optical fiber transmission system, which includes a conventional rare earth doped optical fiber and an excitation source which is a multilayer film structure formed directly on the fiber.

Figure 1:
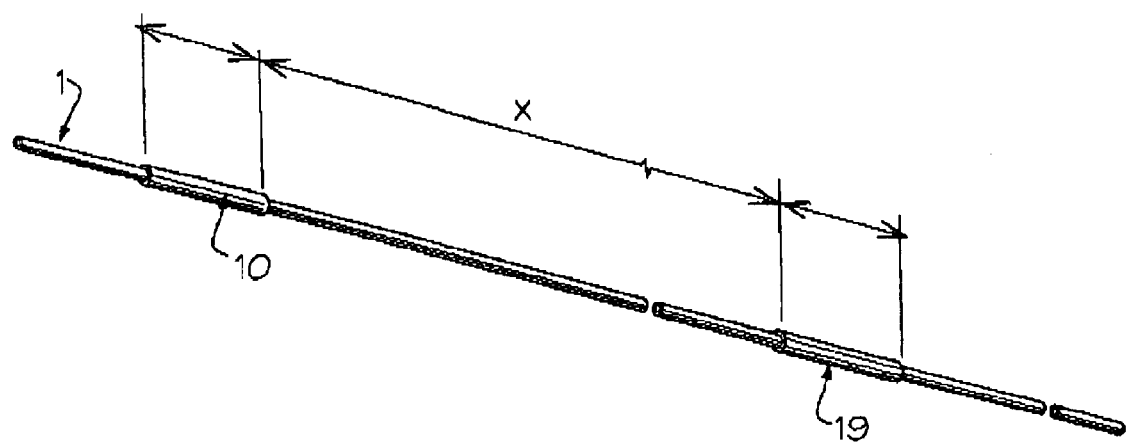
FIG. 1 is a schematic representation of an optical fiber with an integrated optical pumping unit showing approximate dimensions of the pumping unit and of distances between adjacent units as practiced in long distance transmissions.

Turning first to the various figures of the drawing, FIG. 1 illustrates individual amplifying elements 10 in accordance with the present invention distributed at distances designated as x along the length of optical fiber 1. The distance x varies within the range of approximately 40 km to over 200 km, depending on a variety of factors affecting the attenuation of the transmitted signal. Each amplifying element consists of a multilayer pumping unit 20 directly applied to or formed on an underlying length of rare earth doped optical fiber. The rare earth doped optical fiber of each amplifying element is connected to each length of ordinary optical fiber 1 by means well known in the art. Typically each amplifying element is from about 10 meters to about 30 meters in length, although longer and shorter amplifying elements are also within the scope of the present invention.

Figure 2:
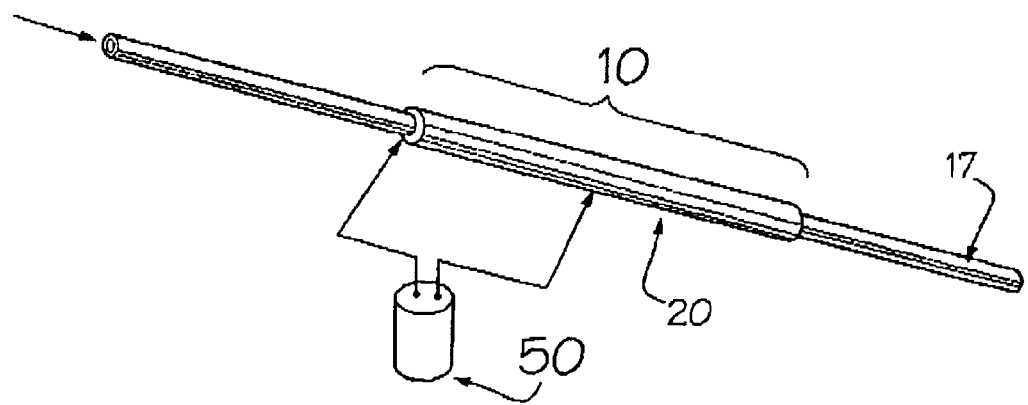
FIG. 2 is schematic detail of the optical fiber and integrated optical pumping unit of FIG. 1.
Figure 6:
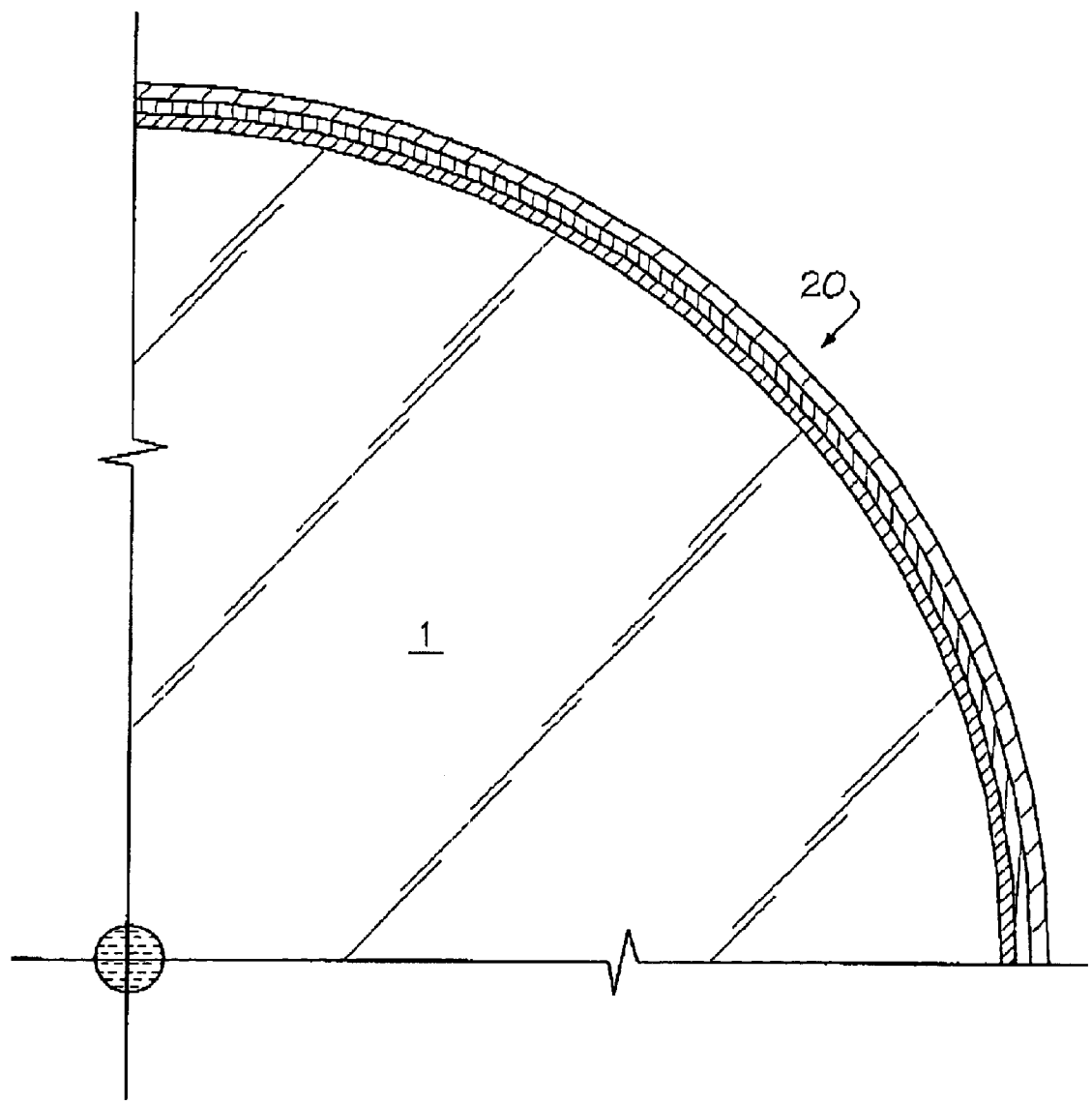
FIG. 6 is a cross-sectional view of an optical pumping unit in accordance with the present invention directly integrated onto an optical fiber, showing approximate relative dimensions of the pumping unit and the fiber.

FIG. 2 illustrates a single amplifying element 10 including an electrical power source 50 electrically connected to the pumping unit 20. FIG. 6 is a cross-sectional view of the pumping unit 20 on the optical fiber 1 showing the approximate relative dimensions of the two.

Figure 3:
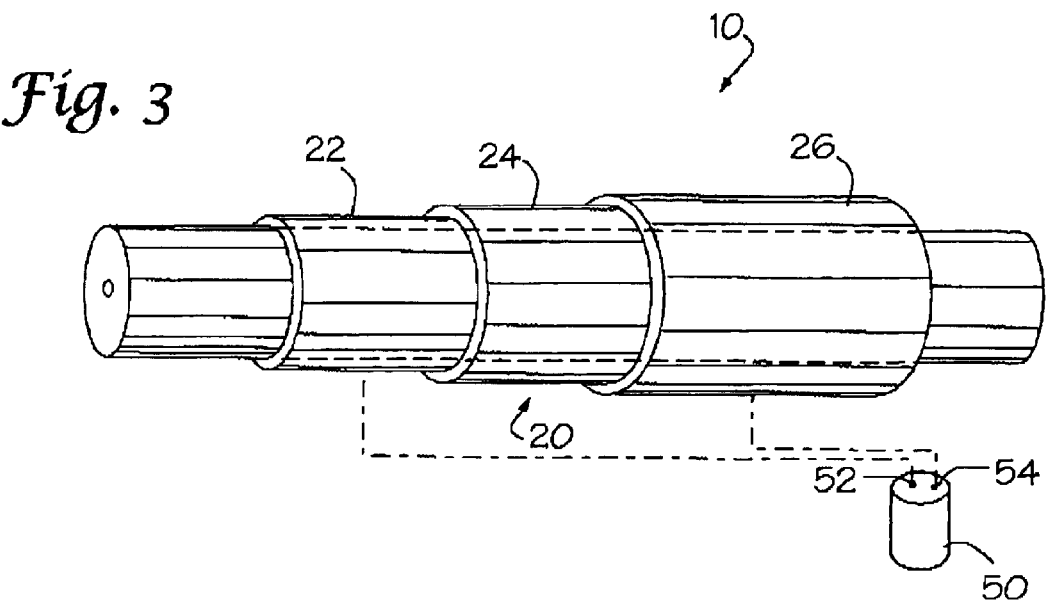
FIG. 3 is a blown-up view of an optical pumping unit in accordance with the present invention integrated directly onto an optical fiber.

FIG. 3 illustrates the amplifying element 10 of FIG. 2 including a blown-up view of the pumping unit 20. Specifically, in a preferred embodiment the innermost, first functional layer 22 of the optical pumping unit is a transparent, electrically conductive film. The middle, second functional layer 24 is a polymer film capable of electroluminescence. The outermost, third functional layer 26 is a reflective, preferably metallic, electrically conductive film. The power source 50 includes positive and negative poles, 52 and 54, which are connected to the first functional layer 22 and the third functional layer 26, respectively, of the multilayer pumping unit. Current passing through the middle, second functional layer 24 excites luminescence of the emissive polymer, which is transmitted through the transparent first layer to the underlying optical fiber 12 and thereby energizes the atoms of the dopant, represented at 14. In response to such luminescence the atoms of the dopant radiate energy at the wavelength of the transmitted signal thereby amplifying the optical message.

Figure 4:
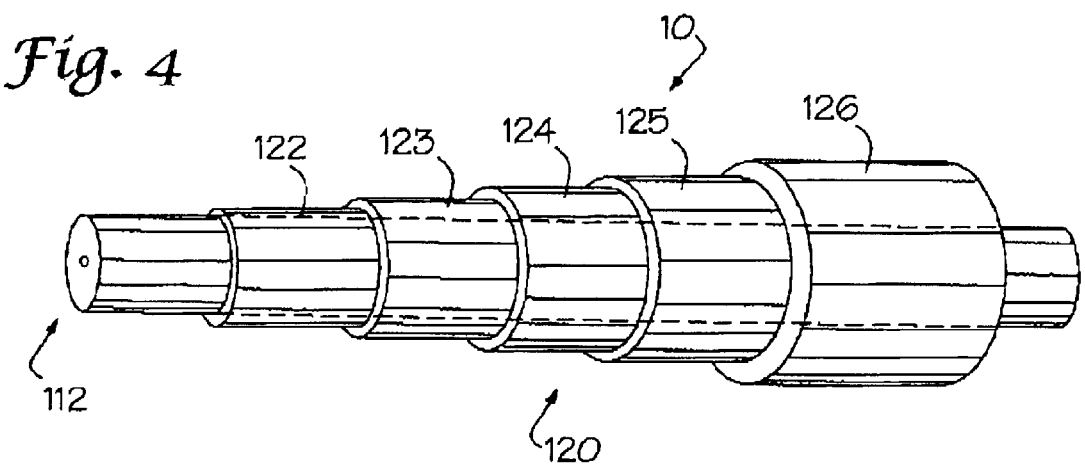
FIG. 4 is a blown-up view of an optical pumping unit in accordance with the present invention directly integrated onto a cladding encased optical fiber.

FIG. 4 illustrates an amplifying element substantially as illustrated in FIG. 3. However, the pumping unit 120 has been formed onto the surface of an outer cladding layer 116 of underlying optical fiber 112. Cladding is commonly employed to enhance the internal reflection of the amplified light in such an optical fiber and to improve the strength of the optical fiber. Also, pumping unit 120 includes buffer layers 123 and 125 sandwiched between first functional layer 122 and second functional layer 124, and between second functional layer 124 and third functional layer 126, respectively.

Figure 5:
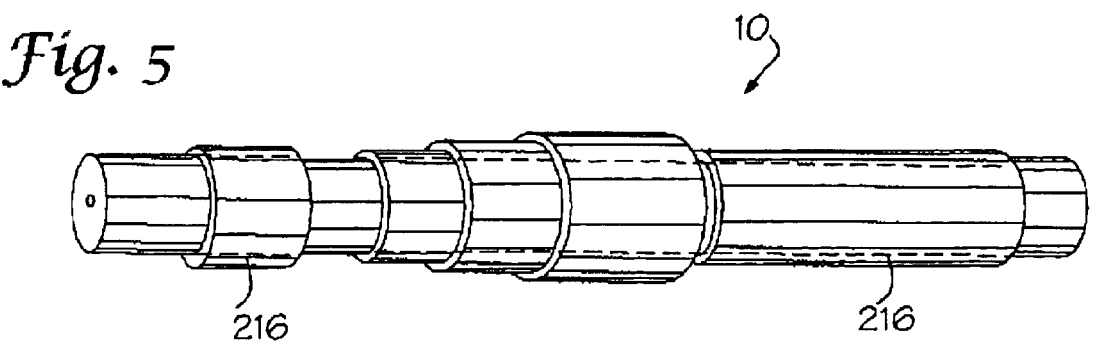
FIG. 5 is a blown-up view of an optical pumping unit in accordance with the present invention directly integrated onto an optical fiber, which includes a cladding layer, wherein the cladding has been stripped from the fiber to allow direct integration of the optical pumping unit with the optical fiber.

Alternatively, FIG. 5 illustrates an optical fiber 212, which includes a cladding layer 216 wherein the cladding layer has been stripped from the underlying optical fiber prior application of the integrated pumping unit onto the optical fiber.

In a specific example, the wavelength of the optical signal being transmitted is in the near-infra-red portion of the spectrum, approximately 1550 nm. The luminescence of the emissive polymer film is in the green portion of the visible spectrum, approximately 540 nm, which is appropriate to excite the rare earth dopant to radiate energy in the near-infra-red portion of the spectrum, thereby amplifying the initial optical signal.

In a preferred embodiment the optical fiber is a commercially available cylindrical, glass fiber. Most preferred are $SiO_2$ fibers such as those supplied by Corning Glass, Corning, N.Y. In accordance with the present, the optical fiber core for use in an amplifying element has been doped with a rare earth element, most preferably erbium, although other rare earth elements such as Nd, Pr, Tm, Ho, Ce, Yb, Tb, Sm, Gd, and Eu may also be employed. Typically, the active optical core is supplied fully clad with commercial material having a refractive index less than that of the active optical core to enable total internal reflection of the signal.

Preferably, the optical pumping unit is deposited as thin film layers along segments of the optical fiber. The pumping units are commonly spaced at intervals of over 40 km but less than 200 km along the length of the optical fiber. The pumping unit segments vary in length from about 10 meters to about 30 meters. However, the present invention anticipates deposited segments as short as one meter and as long as at least 100 meters. The doped optical fiber with the deposited pumping unit becomes a signal-amplifying element. These amplifying elements are physically spliced at the above-noted intervals into the fiber network by means well known in the art. It should be noted that the splicing technology for inserting segments of optical fiber is less complex than the technology required to couple conventional, remote pumping devices to the amplifying optical fiber.

In one embodiment, the pumping unit is an organic light emitting diode. It is deposited as three or more functional layers of film with the first deposited onto the surface of the amplifying optical fiber. Preferably, buffer layers are deposited between the first functional layer and the second functional layer and between the second functional layer and the third functional layer of the pumping unit. This unit is a charge balanced dual-injection organic diode. Work functions and ionization potentials should be matched between contacts and the active layer for low turn-on voltages. Within the device there are two important interfaces to the emissive layer, one from the anode, or hole injection side, and one from the cathode, or electron injection side. In order to lower the energy of injection, therefore the operating voltage/power, the interfaces should be designed such that the work function difference between buffer and emissive layer is small. However, these interfaces also allow for blocking of the electrons from entering the hole injection side and vice versa for blocking holes from the electron injection side. Thus, the potential barrier due to the work function difference should be large enough to affect this purpose. Ideal ranges are: 0.25V less than or equal to the work function difference less than or equal to 5V.

The first functional layer is a transparent, electrically conductive material. One preferred material for use as the first functional layer is indium tin oxide (ITO), supplied by Aesar Chemical, Ward Hill, Mass. Other possible materials for the first functional layer include SnO or polyethylene dioxythiophene (PEDOT). Ideally, as a substrate this could be a PEDOT/poly(styrenesulfonate) such as Baytron P HC8000 supplied by Bayer Chemicals, Newton, Mass., preferably with from about 0.1% to about 0.5% carbon nanotubes. Conductivity should be around 1 k$\Omega$/□ or less. This is used as a supply for hole injection current.

Thus, in a typical application a film of ITO is deposited onto the cleaned surface of the doped optical fiber using well known evaporative technology. The deposition is carried out in a vacuum system chamber under a pressure of 10 torr. The reagent grade ITO is heated in a boat to a minimum temperature of 1100° C. The optical fiber onto which the ITO is to be evaporated is rotated in the vacuum chamber at a rate of from 5 to 100 rpm for a period of up to ten minutes, until a film of ITO of from about 5 nm to about 100 nm, preferably from about 5 nm to about 20 nm is deposited on the optical fiber. The film is allowed to dry on the optical fiber at room temperature.

Thereafter, a first buffer layer is deposited on the surface of the first functional layer. Preferably, the buffer comprises a 20:1 solution of chloroform:PEDOT or Baytron P from Bayer. If PEDOT is used for the conductive layer then it is not required as a buffer layer as well. Similarly, in the case where a buffer layer is sufficiently conductive, i.e., less than or equal to about 10 ohms/square, the first functional anode layer can be entirely replaced by the buffer layer. In essence, the buffer layer becomes the first functional layer electrode. In an argon atmosphere the ITO-coated optical fiber is spun at a speed of from about 500 to about 3000 rpm, and the buffer solution is dripped onto the spinning fiber. The rotating fiber is removed from the rotational source with a film of the buffering solution adhering to the ITO surface. The thickness of the buffer may vary from about 80 to about 500 nm, with a preferred thickness of from about 150 nm to about 250 nm. Since the buffer layer is preferably polymeric, one function of such is to provide a smooth interface between the emissive (second functional) layer and the electrode (first and third functional) layers. The layered material is dried at room temperature in an inert (argon) atmosphere.

The second functional layer comprises a film of an electro-luminescent polymer capable of producing luminescence in the wavelength of the green portion of the visible spectrum of radiation. In this illustration a film of poly(meta) phenylene vinylene, PmPV, such as may be obtained from Aldrich Chemical, St. Louis, Mo., is deposited on the surface of the first buffer layer by spinning the fiber with said layer in a 20:1 solution of methanol:PmPV at approximately 2000 RPM until a layer of from about 80 to 500 nm, preferably 200 nm is deposited when the spinning fiber is removed from the solution. The fiber is dried at room temperature in an inert (argon) atmosphere.

Improvements to the emissive layer may be made through the use of physical or chemical hybrids and composites at the nanoscale where charge mobility or energy transfer can be further tailored. Higher luminescence efficiencies or more narrow emission linewidths (e.g., towards superfluorescence or lasing) may be desirable in certain applications thus the addition of carbon nanotubes for extended device lifetimes or quantum dots (e.g., CdS) for enhanced spectral selectivity are envisaged.

A second buffer layer may be deposited on the surface of the second functional layer. While this will help charge balance in the device, it is not absolutely necessary. However, preferably a film of 8-hydroxyquionoline aluminum ($Alq_3$) is evaporated onto the surface of the second functional layer. The fiber material to which the $Alq_3$ is to be evaporated is placed in an inert (argon) atmosphere under a vacuum pressure of 10 torr. The $Alq_3$ is heated to 1100° C. and the fiber is spun at 5 to 100 rpm for up to 10 minutes. The maximum thickness of the deposited layer is about 50 nm, and the minimum thickness of the resulting layer is 10 nm. The thickness of the deposited layer is a function of the rotation speed of the fiber on which the buffer is deposited and of the length of time the fiber is rotated in the presence of the heated $Alq_3$. The material is dried at room temperature in an inert (argon) environment.

The outermost, third functional layer comprises a film of reflective, electrically conductive material. In this illustration the material is aluminum and calcium in the ratio of 2:1 Al:Ca. The Al/Ca electrically conductive material is coevaporated onto the second buffer layer by heating the aluminum to a temperature of 1000° C. and the calcium to a temperature of 500° C. The fiber onto which the AlCa is to be deposited is spun in the presence of the heated metals at 10–1000 rpm. The minimum functional thickness of the resulting film is 50 nm. Other cathode materials include Au, Ag, and Al/LiF.

It should be noted that, in the present embodiment the first functional layer is the anode and the reflective third functional layer is the cathode because it is metallic and, therefore, opaque. However, it is also within the scope of the present invention to provide a transparent third functional layer. For such structure either electrode layer may serve as the cathode or the anode.

For either embodiment, the completed pump unit and waveguide on which it is deposited constitute an amplifying element of the optical fiber system. This segment is spliced into the signal transmitting optical fiber.

The three layers deposited on the optical core are effectively fully integrated with the optical core and they comprise the foundation of the optical pump unit. The poles of a DC power source are electrically connected to the first functional layer and the third functional layer of the optical pumping unit such that energy passes through the second functional layer. To avoid short-circuiting the optical pumping unit, the electrical connection to the first functional layer must be isolated from contact with other layers. This is accomplished by physically removing materials comprising the other layers from the first functional layer at the point of attachment of the electrical connection. The electrical connection to the surface of the third functional layer is isolated by ensuring that the electrical connection is made only to the outer surface of the third layer. The connections yield a flow of electrical energy from the outermost layer to the innermost layer of the pumping unit. This flow provides the energy to provoke luminescence in the middle, second functional layer at a wavelength capable of exciting atoms of the dopant in the optical core (green portion of the visible spectrum, approximately 540 nm). When stimulated by the optical signal, the excited dopant radiates energy in the near-infra-red portion of the spectrum thereby amplifying the message signal propagating through the fiber.

The preceding illustrates an optical pumping unit anticipated by this invention and combinations of appropriate materials and methods of depositing them to effect the purposes of this invention, the amplification of a signal being transmitted through an optical fiber. The illustration is an example of combinations and methods of deposition, not a limitation on either materials or methods of deposition. The invention anticipates a variety of optical fibers other than those made of $SiO_2$, including, but not limited to various transparent polymer materials and glasses such as other oxides and non-oxides.

In addition, the invention anticipates a variety of dopants other than erbium that may be effective in amplifying signals transmitted in wavelengths other than that of near-infra-red radiation. Given the anticipation of additional dopants, the invention also anticipates the use of other sources of electroluminescence including, but not limited to, poly(2-methoxy-5-(2'-ethylhexyoxy)-p-phenylenevinylene) (MEHPPV), dicarbazole azobenzene (DCAB), and fluoropolymers.

Other methods to deposit various layers are also anticipated and are well understood and recognized by those skilled in the art. For deposition of the first functional layer, for example, in addition to evaporation, the use of sol-gels, pulsed laser deposition (PLD), and sputtering techniques are anticipated. For deposition of the luminescent layer, in addition to the method described in the illustration, dip/spin methods and spray methods are anticipated.

Figure 7:
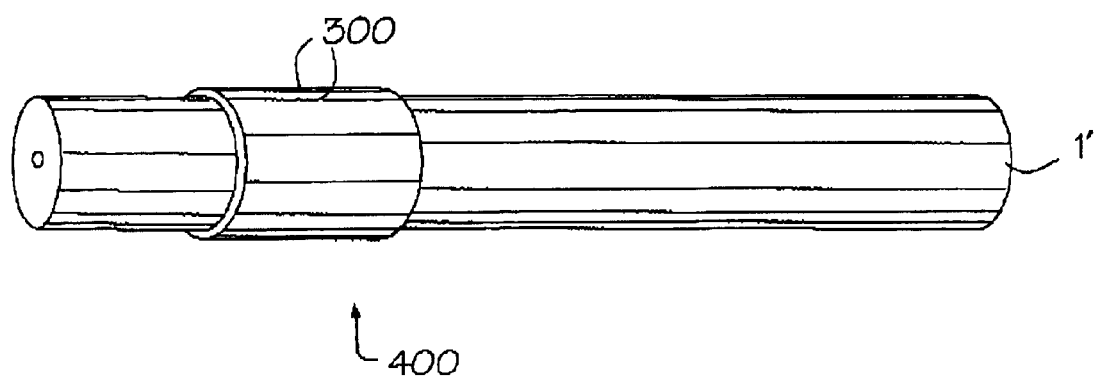
FIG. 7 is side view of an optical pumping unit in accordance with the present invention, which is a microring laser, and which is directly integrated onto an optical fiber.

As an alternative embodiment, the light pump source may be an organic microring laser 300 integrated onto doped optical fiber 1', as is shown in FIG. 7. A microring laser pump source in accordance with the present invention is preferably a monolayer structure made using a light emissive material such as those noted above which, again, possess an emission that is spectrally resonant with an appropriate excitation in the active fiber. The emission from the microring is excited either photoluminescently or electroluminescently, as is represented by excitation source 400 in FIG. 7, and the emission coupled into the optical fiber evanescently.

Specifically, microrings typically consist of a single light emissive material, often polymeric, fashioned as a layer coaxial to and in contact with the fiber. On excitation by an external laser source the subsequent emission is largely confined to this structure and propagates radially around the microring. When sufficient gain is realized, the emission, waveguided around the microring, narrows and lasing is achieved. This light can be transferred from the microring source into the underlying optical fiber, which, like the above-described LED, then permits its use as an integrated source to excite active species in the fiber. Microring structures would tend to provide a more spectrally narrowed emission than in the LED structures of the present invention, which might be desirable for applications where higher gain is required of the active fiber. However, they often are initially excited with an external light source as opposed to the LED structure, which can be directly excited electrically.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims. Moreover, Applicants hereby disclose all sub-ranges of all ranges disclosed herein. These sub-ranges are also useful in carrying out the present invention.

What is claimed is:

1. An amplifying optical element within a signal-carrying system, comprising:
    a dielectric optical waveguide transmitting a signal and capable of excitation; and
    an optical excitation source comprising a microring laser, said microring laser comprising a film, said microring laser being physically integrated with and immediately adjacent to and surrounding said optical waveguide, and
    means for optically exciting said microring laser;
    wherein emission from said microring laser propagates radially around said microring until sufficient gain is realized to enable power gain of said signal.

2. The amplifying optical claim 1 wherein the microring laser comprises a monolayer film.

3. The amplifying optical element of claim 1 wherein the means for optically exciting said microring laser comprises photoluminescent means.

4. The amplifying optical element of claim 1 wherein the means for optically exciting said microring laser comprises electroluminescent means.

5. The amplifying optical element of claim 1 wherein the optical waveguide comprises an optical fiber.

6. The amplifying optical element of claim 5 wherein the optical fiber is doped with a rare earth element.

7. The amplifying optical element of claim 1 wherein the microring laser comprising a film comprises a polymeric film.

8. The amplifying optical element of claim 7 wherein the polymeric film is formed of a polymer selected from the group consisting of poly(meta)phenylene vinylene, poly(2-methoxy-5-(2'-ethylhexyoxy)-p-phenylenevinylene), dicarbazole azobenzene, and fluoropolymers.

* * * * *